United States Patent Office 3,210,178
Patented Oct. 5, 1965

3,210,178
COMPOSITIONS FOR THE SELECTIVE COMBATING OF MONOCOTYLEDONOUS SEEDS IN CULTURES OF USEFUL PLANTS
Josef Kaupp and Erich Hambsch, Gersthofen, near Augusburg, and Heribert Hahne and Ernst Welte, Hofheim, Taunus, Germany, assignors to Farbwerke Hoechst Aktiengesellschaft vormals Meister Lucius & Brüning, Frankfurt am Main, Germany, a company of Germany
No Drawing. Filed May 13, 1963, Ser. No. 280,106
7 Claims. (Cl. 71—2.7)

The present application is a continuation in part application of our application Serial No. 131,427, filed August 14, 1961, now abandoned.

It is known that the derivatives of trichloracetic acid are useful as agents for combating weeds (see United States Patent No. 2,393,086). Sodium trichloracetate is extensively used, and more especially for the destruction of monocotyledonous weeds. Derivatives of chloral are also controlling agents and they have a preferential action on Gramineae.

The present invention provides preparations for combating weeds, especially for the selective combating of monocotyledonous weeds among crop plants, which comprise a salt of trichloracetic acid and N-(1-hydroxy-2:2:2-trichlorethyl)-monochloracetamide in admixture with a solid or liquid carrier and a surface-active substance.

As salts of the trichloracetic acid, there may be mentioned the sodium, potassium, ammonium and calcium salts.

The active substances, i.e. the salt of trichloracetic acid and N-(1 - hydroxy-2:2:2-trichlorethyl)-monochloracetamide, are advantageously present in a ratio without the range of 65:35 to 50:50.

The weed-controlling prepartions of the invention may be made up in solid or liquid form. The solid preparations may contain the mixture of active substances in admixture with an inert solid material, for example, talcum, kaolin or sand. They are advantageously in the form of wettable powders which contain 10–30% of a protective colloid and a dispersing agent, for example, sodium lignin sulfonate, casein, or methyl cellulose, 0.1 to 3% of a wetting agent, for example, an alkyl-aryl sulfonate, a polyoxethylated alkyl-phenol or oleic acid methyltauride. In the liquid form the weed-controlling preparations may contain the mixture of active substances in methanol or another solvent and 1–5% of a non-ionic wetting agent, for example, an oxethylated alkyl-phenol, an oxethylated carboxylic acid or an alcohol or ester or a mixture of ionic and non-ionic wetting agents, for example, of a calcium alkyl-aryl sulfonate and one of the aforesaid non-ionic wetting agents. The weed-controlling prepartions are usually applied in accordance with the pre-emergence method, namely 3 to 14 days before sowing.

The known mechanical means for controlling weeds among, for example, oil seed, vegetable and sugar beet crops, are less effective the larger the quantity of Gramineae among the weeds. Thus, the uncontrolled growth of, for example, wild oats, renders the cultivation of beet or pea crops uneconomical. In the preparations of the present invention the mixture of active substances does not exhibit only the known action of the individual components on monocotyledonous weeds, but exhibits an unforeseen synergistic action, which considerably surpasses the sum of the actions of the two active substances. Furthermore, the preparations do not injure crop plants.

The activity of preparations, which are applied by the pre-emergence method, generally depends on the weather. In order to exert their full activity, preparations which are sparingly soluble in water require relatively large quantites of rain, whereas those which are readily soluble in water are rapidly washed away and, therefore, attain their optimum activity with relatively small quantities of rain. However, the preparations of the present invention, which comprise a mixture of an easily water-soluble salt of trichloracetic acid with the sparingly water-soluble N-(1-hydroxy-2:2:2 - trichlorethyl)-monochloractamide, is much less dependent on the weather, and, therefore, exerts a considerably improved destructive action on monocotyledonous weeds without injuring the crop plants, as will be seen from Examples 1–3 below. These examples show that, in the cases investigated, the mixture of active substances in the preparations of the invention is far more active against weeds than either of the components used alone and that injury to the crop plants is practically completely avoided.

N-(1-hydroxy-2:2:2 - trichlorethyl) - monochloracet-amide of the formula Cl—CH$_2$CONHCH(OH)—CCl$_3$, can be prepared by the process of German Patent No. 949,946 reacting chloral hydrate with chloracetamide in the presence of sulfuric acid as catalyst. The reaction proceeds as follows:

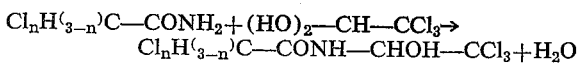

in which $n$ is the whole number 1, 2 or 3. Higher chlorinated acetamides may also be used. After being cooled, the reaction mixture forms a cake, which is dissolved in methanol. Water is then added to the solution, and by isolating and drying the precipitate formed, a crude product is obtained in the following yields:

Monochloracetic acid trichlorethylolamide, 60% of the theoretical yield
Dichloracetic acid trichlorethylolamide, 16.3% of the theoretical yield
Trichloracetic acid trichlorethylolamide, 32.2% of the theoretical yield Recrystallization from organic solvents is necessary to remove unreacted reactants, whereby, however, the yield is diminished. The greater part of the chloral hydrate, the whole of the methanol and at least part of the solvent used for the recrystallization will be lost, because this process offers no possibility of economically working up all the liquors obtained. This known process for making N-(1-hydroxy-2:2:2-trichlorethyl)-chloracetamides is, therefore, unsatisfactory due to the low yield and the troublesome method of purification.

The invention also provides a process for the manufacture of the herbicidally active substance, N-(1-hydroxy-2:2:2-trichlorethyl)-chloracetamide, which avoids the above disadvantages, wherein anhydrous tri-chloracetaldehyde is reacted in an organic solvent with chloracetamide. The reaction proceeds as follows:

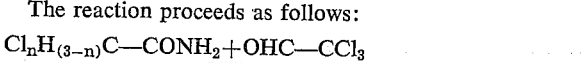

in which $n$ is the whole number 1, 2 or 3. Mixtures of the chlorinated acetamides may also be reacted with the chloral.

By heating mono- di- or tri-chlorinated acetamide with anhydrous trichloracetaldehyde under reflux in a suitable solvent with the addition of a few drops of concentrated sulfuric acid, the reaction product precipitates, upon cooling, in the form of handsome crystals, which are so pure that they do not ned to be recrystallized. The yield exceeds 90%, and is in most cases 93–96% of the theoretical yield. The compound obtained is sparingly soluble in water.

As solvents there may be used, for example, toluene or carbon tetrachloride, or a mixture of paraffin hydrocarbons having a boiling range of 170 and 230° C.

The mono- or tri-chloracetamide used as starting material can be prepared by adding ammonia to an ester of the corresponding chlorinated acetic acid in the solvent to be used for the subsequent reaction. Before carrying out the subsequent reaction with chloral in the presence of a catalytic quantity of a strong acid, it is necessary to eliminate the excess of ammonia, for example, by neutralization.

The new process for making N-(1-hydroxy-2:2:2-trichlorethyl)-chloracetamide enables the starting material to be almost completely utilised. Chloral can be used in a quantity equivalent to that of the chlorinated acetamide, but is preferably used in a slight excess, for example, amounting to 0.4–0.8 molecular equivalent. Since only 1 molecular equivalent of chloral is consumed, the mother liquid can be re-used for a further reaction, without being worked up or purified, after adding one molecular equivalent of chloral. A small loss of organic solvent can be made up by the addition of washing liquid.

The following examples illustrate the invention, but they are not intended to limit it thereto. In the following examples monocotyledonous and dicotyledonous weeds are listed which are especially cumbersome in agriculture. The chemical combating of Gramineae is particularly important because the mechanical means for controlling these weeds require high costs while the results are unsatisfactory. This is due, inter alia, to the strong spreading of the Gramineae, especially of wild oats (*Avena fatua*), on account of the flying organs of the seeds.

As a representative of Gramineae *Avena fatua* has been used since this weed is the most dangerous one and in some regions it has fully suppressed the sugar beet cultivation. Wild oats germinate, for example, under most unfavorable ecological conditions. The seeds germinate, for example, in a depth of soil and in a season in which other usual Gramineae no longer develop. It is, therefore, considered to be not necessary to treat in the examples further types of grass.

From among the dicotyledonous weeds there have been used those which can be controlled with the usual preparations under favorable conditions only.

The examples were carried out in the following manner: A seed mixture of the weeds defined in the individual examples was mixed with the soil during cultivation by means of common agricultural tools, each time the same amount per square meter was distributed an uniformly as possible. The herbicidal preparations were then applied by spraying.

In the examples the following preparations were used:

Preparation No. 1=sodium trichloracetate (in Example 1) or ammonium trichloracetate (in Example 2) or calcium trichloracetate (in Example 3) dissolved in 800 litres of water/ha.

Preparation No. 2=a wettable powder containing 85% of N-(1-hydroxy-2:2:2-trichlorethyl)-monochloracetamide and a dispersing agent, dispersed in 800 litres of water/ha.

Preparation No. 3 (according to the invention)=a mixture of 50% of sodium trichloracetate (in Example 1) or ammonium trichloracetate (in Example 2) or calcium trichloracetate (in Example 3) and 45% of N-(1-hydroxy-2:2:2-trichlorethyl)-monochloracetamide, and a dispersing agent, in 800 litres of water/ha.

In each case 800 litres of water are used for one hectar and the amount of preparation for one hectar is dissolved or dispersed in 800 litres of water.

3 to 12 days after the application of the preparation, the cultures are sown. The exact date of the sowing is indicated in each example.

The results of a plurality of tests are summarized in the tables of the examples. The numbers given in the horizontal rows adjacent to the names of the weeds denote the number of weeds per square meter on the average. In the column "untreated" is listed the number of weed plants growing from the seeds without treatment with the preparations. These data indicate the number of weed seeds capable of germinating present in the individual plots and the effectiveness of the preparations on the various types of weeds.

The numbers given for injury to crop plants have the following meanings:

0=no injury at all,
1=slight curling of the cotyledons,
2=slight curling of the cotyledons and of the 1st pair of leaves
3=growth inhibition from which the plants recovered after 2 to 4 weeks,
4=permanent growth inhibition or serious injury,
5=total destruction.

Other details of the tests are given after each table.

The following three examples show that smaller amounts of the preparation according to the invention (preparation No. 3), have a better herbicidal effect than higher amounts of the individual components (preparations 1 and 2) and that its effect is far superior to the additive effect. However, the examples not only reveal the synergistic effect of preparation 3. When considering the last column "injury to culture plants" one can see that amounts of the individual components (preparations 1 and 2) which do not yet exhibit a sufficient herbicidal effect already injure crop plants, while the preparation according to the invention, even in an amount which has a good weed combating action, does not injure the crop plants.

EXAMPLE 1

*Selective combating of weeds in sugar beets*

|  | Preparation No. 1 | | | Preparation No. 2 | | | Preparation No. 3 according to invention | | Untreated |
|---|---|---|---|---|---|---|---|---|---|
|  | 10 kg./ha. | 20 kg./ha. | 30 kg./ha. | 10 kg./ha. | 20 kg./ha. | 30 kg./ha. | 20 kg./ha. | 30 kg./ha. |  |
| Wild oats (*Avena fatua*) | 120 | 16 | 3 | 128 | 86 | 38 | 7 | 2 | 312 |
| Charlock (*Sinapis arvensis*) | 143 | 120 | 73 | 110 | 16 | 4 | 23 | 0 | 168 |
| Orach (*Chenopodium album*) | 46 | 22 | 12 | 35 | 8 | 3 | 13 | 3 | 47 |
| Chick-weed (*Stellaria media*) | 31 | 18 | 16 | 21 | 6 | 4 | 4 | 0 | 36 |
| Goose grass (*Gallium aparine*) | 20 | 14 | 10 | 9 | 5 | 4 | 5 | 4 | 21 |
| Knot-grass (*Pologonum convolvulus*) | 38 | 16 | 13 | 35 | 6 | 2 | 13 | 0 | 46 |
| Injury to crop plants | 1 | 2 | 3 | 0 | 1 | 3 | 0 | 0 | 0 |

Day of treatment: 12th day prior to sowing the sugar beets (variety Kleinwanzlebener).
Evaluation: 8 weeks after sowing.
The tests were carried out 4 times.
Size of the plots: 30 square metres.

EXAMPLE 2
Selective combating of weeds in peas

| | Preparation No. 1 | | | Preparation No. 2 | | | Preparation No. 3 according to invention | | | Untreated |
|---|---|---|---|---|---|---|---|---|---|---|
| | 5 kg./ha. | 15 kg./ha. | 25 kg./ha. | 5 kg./ha. | 15 kg./ha. | 25 kg./ha. | 5 kg./ha. | 15 kg./ha. | 25 kg./ha. | |
| Wild oats (*Avena fatua*) | 82 | 24 | 6 | 135 | 48 | 17 | 55 | 3 | 3 | 222 |
| Charlock (*Sinapis arvensis*) | 41 | 22 | 18 | 19 | 26 | 12 | 37 | 19 | 15 | 36 |
| Orach (*Chenopodium album*) | 3 | 2 | 2 | 1 | 3 | 1 | 1 | 1 | 1 | 4 |
| Rag wort (*Senecio vulgaris*) | 20 | 18 | 18 | 19 | 4 | 12 | 15 | .6 | 3 | 21 |
| Dead nettle (*Lamium purpureum*) | 14 | 18 | 5 | 11 | 11 | 10 | 10 | 5 | 1 | 12 |
| Injury to culture plants | 1 | 3 | 4 | 0 | 3 | 3 | 0 | 0 | 1 | 0 |

Treatment: 10 days prior to sowing.
Evaluation: 7 weeks after sowing.
Soil: Loess clay.
Soil No.: 88.
Size of plots: 10 square metres, 4 repetitions.

EXAMPLE 3
Selective combating of weeds in oil radish

| | Preparation No. 1 | | | Preparation No. 2 | | | Preparation No. 3 according to invention | | | Untreated |
|---|---|---|---|---|---|---|---|---|---|---|
| | 5 kg./ha. | 15 kg./ha. | 25 kg./ha. | 5 kg./ha. | 15 kg./ha. | 25 kg./ha. | 5 kg./ha. | 15 kg./ha. | 25 kg./ha. | |
| Fox-tail (*Alepocurus myosuroides*) | 46 | 7 | 7 | 61 | 7 | 14 | 26 | 2 | 4 | 62 |
| Agrostis spica venti | 14 | 5 | 5 | 19 | 11 | 3 | 5 | 1 | 1 | 18 |
| Chick weed (*Stellaria media*) | 16 | 11 | 10 | 10 | 7 | 2 | 11 | 5 | 4 | 14 |
| Dead nettle (*Lamium purpureum*) | 5 | 2 | 1 | 2 | 3 | 1 | 2 | 1 | 1 | 3 |
| Rag wort (*Senecio vulgaris*) | 1 | 3 | 1 | 0 | 1 | 0 | 1 | 0 | 0 | 3 |
| Orach (*Chenopodium album*) | 8 | 10 | 4 | 5 | 5 | 0 | 6 | 0 | 4 | 9 |
| Injury to culture plants | 0 | 0 | 3 | 0 | 0 | 3 | 0 | 0 | 0 | 0 |

Treatment: 3 days prior to sowing.
Evaluation: 10 weeks after sowing.
Soil: clayey sand.
Soil No.: 38. Size of plots: 10 square metres, 3 repetitions.

EXAMPLE 4
*N-(1-hydroxy-2:2:2-trichlorethyl)-monochloracetamide*

1,032 grams (7 mils; 1.75 mol equivalents) of anhydrous trichloracetaldehyde, and 0.5 grams of concentrated sulfuric acid were added, while stirring, to a mixture of 2,550 grams of toluene and 374 grams (4 mols) of monochloracetamide, and the whole was heated under reflux for 6 hours in an oil bath, while stirring. The chloracetamide, initially in suspension, dissolved as the reaction proceeded. The whole was allowed to cool, whereupon the final product precipitated in handsome crystals, and the precipitate was filtered off with suction. The residue was washed three or four times with cold carbon tetrachloride.

It is advantageous to remove the filtrate before washing the residue, because it can be utilized in a further reaction. For re-use there were added to the filtrate 590 grams (4 mols; 1 mol equivalent) of chloral and, if required, a small quantity of toluene.

The final product was dried in air at a temperature of 20–50° C. 910 grams of product in the form of colourless crystals melting at 134–136° C. were obtained. The yield was 94% of the theoretical yield, calculated on the chloracetamide. For industrial purposes, washing of the product is not necessary.

EXAMPLE 5
*N-(1-hydroxy-2:2:2-trichlorethyl)-dichloracetamide*

530 grams (3.6 mols; 1.5 mol equivalents) of anhydrous trichloracetaldehyde and 0.3 gram of concentrated sulfuric acid were added to a mixture of 900 grams of carbon tetrachloride and 308 grams (2.4 mols) of dichloracetamide, and the whole was heated under reflux for 6 hours in an oil bath. At first a milky turbid solution formed, but the reaction product crystallised out during the reaction.

The mixture was cooled to below 20° C., and the precipitate was filtered off with suction. The residue was washed four times with cold carbon tetrachloride.

If the mother liquor was to be re-used, the filtrate was removed before washing the residue, 354 grams (2.4 mols; 1 mol equivalent) of chloral were added, and the quantity of carbon tetrachloride lost was replaced by washing liquid.

The final product was dried in air at 20–50° C. 632 grams of colourless crystals melting at 123° C. were obtained. The yield was 95.5% of the theoretical yield.

EXAMPLE 6
*N-(1-hydroxy-2:2:2-trichloroethyl)-trichloracetamide*

3,100 grams (21 mols; 1.75 mol equivalents) of anhydrous trichloracetaldehyde and 1.5 grams of concentrated sulfuric acid were added, while stirring to a mixture of 4,200 grams of carbon tetrachloride and 1,950 grams (12 mols) of trichloracetamide, and the whole was heated under reflux for 6 hours, while stirring. Alternatively, the reaction mixture may be heated in a closed vessel at an internal temperature of 80 to 110° C. A solution was initially formed but during the reaction the reaction product crystallized out in the form of fine lamellae.

The mixture was cooled to below 20° C., and the precipitate was filtered off with suction. The residue was washed 4 times with cold carbon tetrachloride.

If the mother liquor is to be re-used, the procedure referred to in Examples 4 and 5 is followed.

The final product was dried at 20–25° C. There were obtained 3,560 grams of colourless lamellae melting at 140–142° C. The yield was 96% of the theoretical yield.

EXAMPLE 7

*N-(1-hydroxy-2:2:2-trichlorethyl)-trichloracetamide*

A quantity of gaseous ammonia amounting to 1 molecular equivalent was introduced into a mixture of 460 grams (2.4 mols) of trichloracetic acid ethyl ester and 900 grams of a mixture of hydrocarbons having a boiling range from 170 to 230° C., while cooling with flowing water. The mixture was saturated with hydrogen chloride to neutralise any excess of ammonia, then the mixture was heated to an internal temperature of 65–68° C., and 620 grams (4.2 mols; 1.75 equivalents) of anhydrous trichloracetaldehyde were run in in the course of about one hour, while stirring. When the addition was complete, stirring was continued until the total period of the reaction was 10 hours.

The reaction mixture was then cooled with running water, and the precipitate was filtered off with suction, and dried at 50° C. in air. 721 grams of white crystals melting at 124° C. were obtained. The yield was 97% of the theoretical yield.

We claim:

1. A preparation for combating weeds, which comprises a member selected from the group consisting of the sodium, ammonium and calcium salt of trichloracetic acid and N-(1-hydroxy-2:2:2-trichlorethyl)-monochloracetamide in a ratio within the range of 65:35 to 50:50, said salt being applied in an amount between 5–30 kilograms per hectare.

2. A preparation as claimed in claim 1, in which the salt of the trichloracetic acid is the sodium salt.

3. A preparation as claimed in claim 1, in which the salt of the trichloracetic acid is the ammonium salt.

4. A preparation as claimed in claim 1, in which the salt of the trichloracetic acid is the calcium salt.

5. A preparation as claimed in claim 1, which is in the form of a wettable powder.

6. A preparation as claimed in claim 1, which is in liquid form and contains a solvent as liquid carrier.

7. The method of selectively combating monocotyledonous weeds in crop plants, which consists of applying to the soil of said plants a member of the group consisting of the $NH_4-$, $Na-$ and Ca salt of trichloracetic acid and in addition thereto N-(1-hydroxy-2:2:2-trichlorethyl)-monochloracetamide, said salt being applied in an amount between 5–30 kilograms per hectare.

References Cited by the Examiner

UNITED STATES PATENTS 2,622,974 12/52 Swezey _____ 71—2.7
2,936,323 5/60 Eden.

JULIAN S. LEVITT, *Primary Examiner.*